(12) United States Patent
Huitema

(10) Patent No.: US 7,370,197 B2
(45) Date of Patent: May 6, 2008

(54) METHOD AND SYSTEM FOR AUTHENTICATING MESSAGES

(75) Inventor: Christian Huitema, Clyde Hill, WA (US)

(73) Assignee: Microsoft Corporation, Redmond, WA (US)

( * ) Notice: Subject to any disclaimer, the term of this patent is extended or adjusted under 35 U.S.C. 154(b) by 798 days.

(21) Appl. No.: 10/242,705

(22) Filed: Sep. 12, 2002

(65) Prior Publication Data

US 2004/0010683 A1 Jan. 15, 2004

Related U.S. Application Data

(60) Provisional application No. 60/395,680, filed on Jul. 12, 2002.

(51) Int. Cl.
*H04L 9/00* (2006.01)
(52) U.S. Cl. .................. 713/162; 713/170; 713/176; 713/180; 713/181; 380/262
(58) Field of Classification Search ............... 713/162, 713/150, 176
See application file for complete search history.

(56) References Cited

U.S. PATENT DOCUMENTS

| | | | |
|---|---|---|---|
| 5,473,691 A | 12/1995 | Menezes et al. | |
| 5,511,122 A * | 4/1996 | Atkinson | 713/153 |
| 5,673,319 A | 9/1997 | Bellare et al. | |
| 5,729,608 A | 3/1998 | Janson et al. | |
| 5,778,065 A | 7/1998 | Hauser et al. | |
| 5,892,904 A | 4/1999 | Atkinson et al. | |
| 6,055,234 A * | 4/2000 | Aramaki | 370/395.72 |
| 6,055,236 A | 4/2000 | Nessett et al. | |
| 6,101,499 A | 8/2000 | Ford et al. | |
| RE36,946 E * | 11/2000 | Diffie et al. | 380/278 |
| 6,367,012 B1 | 4/2002 | Atkinson et al. | |
| 6,615,348 B1 * | 9/2003 | Gibbs | 713/162 |
| 6,687,755 B1 | 2/2004 | Ford et al. | |
| 6,832,322 B1 | 12/2004 | Boden et al. | |
| 6,944,672 B2 | 9/2005 | Crow et al. | |
| 6,957,346 B1 | 10/2005 | Kivinen et al. | |
| 7,032,242 B1 | 4/2006 | Grabelsky et al. | |
| 2002/0152380 A1 * | 10/2002 | O'Shea et al. | 713/170 |

(Continued)

FOREIGN PATENT DOCUMENTS

EP 1333635 6/2003

(Continued)

OTHER PUBLICATIONS

RFC 3972, T.Aura , Microsoft Research Mar. 2005.*

(Continued)

*Primary Examiner*—Nasser Moazzami
*Assistant Examiner*—Fikremarima Yalew
(74) *Attorney, Agent, or Firm*—Merchant & Gould P.C.

(57) ABSTRACT

A method and system for authenticating a message is described, in which the message contains a network address, at least a portion of which is a digital fingerprint. Embedded in the message is data, such as a code, that indicates the size of the digital fingerprint. A device receiving the message uses the size data and, for example, the public key of the sender to attempt to reproduce the digital fingerprint. If successful, the device receiving the message verifies the identity of the sender.

14 Claims, 10 Drawing Sheets

U.S. PATENT DOCUMENTS

| | | | |
|---|---|---|---|
| 2002/0152384 A1* | 10/2002 | Shelest et al. | 713/176 |
| 2003/0065934 A1* | 4/2003 | Angelo et al. | 713/200 |
| 2003/0120929 A1 | 6/2003 | Hoffstein et al. | 713/176 |
| 2003/0142823 A1 | 7/2003 | Swander et al. | |
| 2003/0233568 A1 | 12/2003 | Maufer et al. | |
| 2004/0008845 A1 | 1/2004 | Le et al. | 380/277 |
| 2004/0088537 A1 | 5/2004 | Swander et al. | |
| 2004/0151322 A1 | 8/2004 | Sovio et al. | |
| 2004/0158714 A1 | 8/2004 | Peyravian et al. | 713/171 |
| 2004/0193875 A1 | 9/2004 | Aura | 713/162 |
| 2006/0005014 A1 | 1/2006 | Aura et al. | 713/162 |
| 2006/0020796 A1 | 1/2006 | Aura et al. | 713/168 |
| 2006/0020807 A1 | 1/2006 | Aura et al. | 713/176 |
| 2006/0077908 A1 | 4/2006 | Park et al. | |

FOREIGN PATENT DOCUMENTS

| | | |
|---|---|---|
| WO | WO 2006068450 | 6/2006 |

OTHER PUBLICATIONS

"Glossary for the Linux FreeS/WAN project," (Publication Date Not Available), [34 pages].
Bassil, Alessandro; Laganier, Julien. "Towards an IPv6-based Security Framework for Distributed Storage Resources," Communications and Multimedia Security CMS 2003, Oct. 2-3, 2003, [9 pages].
Benantar, M. "The Internet Public Key Infrastructure," IBM Systems Journal, Vol. 40, No. 3, 2001, pp. 648-665.
Cheng, P.C.; Garay, J.A; Herzberg, A.; Krawczyk, H. "A Security Architecture for the Internet Protocol," 1998, vol. 37, No. 1, pp. 42-60.
Cheng, Pau-Chen; Garay, Juan A.; Herzberg, Amir; Krawczyk, Hugo. "Design and Implementation of Modular Key Management Protocol and IP Secure Tunnel on AIX," Jun. 1995, [15 pages].
Cheng, PC. "An Architecture for the Internet Key Exchange Protocol," IBM Systems Journal, vol. 40, No. 3, 2001, pp. 721-746.
Clark, David D. "IP Datagram Reassembly Algorithms," RFC 815, Jul. 1982, [11 pages].
Higginson, Peter L.; Shand, Michael C. "Development of Router Clusters to Provide Fast Failover in IP Networks," Digital Technical Journal vol. 9, No. 3, 1997, pp. 32-41.
Kent et al. "IP Encapsulating Security Payload (ESP)," The Internet Society, RFC 2406, Nov. 1998, [34 pages].
Koskiahde, Timo. "Security in Mobile IPv6," Apr. 18, 2002, pp. 1-14.
Maughan et al. "Internet Security Association and Key Management Protocol (ISAKMP)," the Internet Society, RFC 2408, Nov. 1998, [141 pages].
Shannon, Colleen; Moore, David; Claffy, K. "Characteristics of Fragmented IP Traffic on Internet Links," Internet Measurement Conference. 2001, pp. 83-97.
Aura, T. "Cryptographically Generated Addresses (CGA)," RFC 3972, Mar. 2005, [21 Pages].
"Computer Networks", AS Tannenbaum, Prentice-Hall, 1989.
Kaufman, C. "Internet Key Exchange (IKEv2) Protocol," RFC 4306, Dec. 2005, [93 pages].
Kent, S. and Atkinson, R. "Security Architecture for the Internet Protocol," RFC 2401, Nov. 1998, [62 pages].
Laganier, J. "Using IKE with IPv6 Cryptographically Generated Address," Network Working Group, Internet-Draft. Feb. 24, 2003, pp. 1-15.
Link, B., Hager, T. and Flaks J. "RTP Payload Format for AC-3 Audio," RFC 4184, Oct. 2005, [13 pages].
Nir, Y. "Repeated Authentication in Internet Key Exchange (IKEv2) Protocol," RFC 4478, Apr. 2006, [5 pages].
Office Action issued in U.S. Pat. Appl. No. 10/401,241 (Jan. 25, 2007).
Snapschout, JLA Van De. "The Sliding window protocol revisited," Formal Aspects of Computing vol. 7, pp. 3-17, 1995.
Hinden et al., IPv6 Working Group Minutes, Minneapolis IETF, Mar. 18, 2002 [accessed May 29, 2005 from http://www.ietf.org/proceedings/02mar/minutes/ipv6.htm], 13pp.
Nordmark, "Allocating bit in IID for Mobile IPv6", Mar. 2002, [accesses May 29, 2005 from http://www.ietf.org/proceedings/02mar/slides/ipv6-13.pdf], 8pp.
Nordmark,"Reserving space in the Interface ID", from Mar. 2002[accessed May 20, 2005 from http://www.ietf.org/proceedings/02mar/slides/ipv6-14.pdf], 6pp.
IETF Proceedings, "Security and Mobile IPv6", Mar. 2001 [accessed May 29, 2005 from http://www.ietf.org/proceedings/01mar/slides/mobileip-9], 1pg.
Kempf et al., "Threat Analysis for IPv6 Public Multi-Access Links", draft-kempf-ipng-netaccess-threats-00.txt, Nov. 2001, 7pp.
Nikander et al., "Threat Models introduced by Mobile IPv6 and Requirements for Security in Mobile IPv6", draft-team-mobileip-mipv6-sec-reqts-00.txt, Jul. 12, 2001, 28pp.
Thomas, "Binding Updates Security", draft-thomas-mobile-bu-sec-00.txt, Nov. 2, 2001, 13pp.
Nikander et al., "Binding Authentication Key Establishment Protocol for Mobile IPv6", draft-perkins-bake-01.txt, Jul. 2, 2001, 42pp.
Thomson, et al., "IPv6 Stateless Address Autoconfiguration," RFC1971 (Aug. 1996) 22 pgs. downloaded from http://www.ietf.org/rfc1971.txt; on Apr. 11, 2006.
O'Shea, et al., "Child-Proof Authentication for MIPv6 (CAM),"vol. 31, No. 2, ACM SIGCOMM Computer Communications Review, Apr. 2001, pp. 4-8.
M. Burrows et al., "A Logic of Authentication" Proceedings of the Royal Society of London Series A, 426, pp. 233-271 (1989).
S. Deering et al., "Version 6 (IPv6) Specification"RFC2460 (Dec. 1998).
"Secure Hash Standard," NIST, FIPS PUB 180-1, http://csrc.nist.goc/fips/fip180-1.txt. (Apr. 1995).
Harkins et al., "The Internet Key Exchange (IKE)," RFC2409 (Nov. 1998).
Hinden et al., "IP Version 6 Addressing Architecture," (Mar. 10, 2000).
Huitema, "Ipv6 The New Internet Protocol," Prentice Hall PTR, ISBN 0-13-850505-5 (1998).
Johnson et al., "Mobility Support in IPv6," (Apr. 27, 2000).
Kent et al., "IP Authentication Header," RFC2402 (Nov. 1998).
Mills, "Simple Network Time Protocol (SNMP) Version 4 for IPv6 and OSI," RFC2030 (Oct. 1996).
Mills, "IP Mobility Support," RFC2002 (Oct. 1996).
Thomson et al., "IPv6 Stateless Address Autoconfiguration," RFC2462 (Dec. 1998).
Kent et al., "Security Architecture for the Internet Protocol," RFC2401 (Nov. 1998).
Aura et al., *Security of Internet Location Management*, Proc. 18th Annual Computer Security Applications Conference, IEEE Press, Nevada (Dec. 2002).
Blaze et al., *The KeyNote Trust-Management System Version 2*, IETF Network Working Group, RFC 2704 (Sep. 1999) pp. 1-35.
Eastlake, *Domain Name System Security Extensions*, IETF Network Working Group, RFC 2535 (Mar. 1999) pp. 1-44.
Ellison et al., *SPKI Certificate Theory*, IETF Network Working Group, RFC 2693 (Sep. 1999) pp. 1-41.
Ferguson et al., *Network Ingress Filtering: Defeating Denial of Service Attacks Which Employ IP Source Address Spoofing*, IETF Network Working Group, RFC 2827 (May 2000) pp. 1-10.
Housley et al., *Internet X.509 Public Key Infrastructure Certificate and Certificate Revocation List (CRL) Profile*, IETF Network Working Group (Apr. 2002) pp. 1-66.
Karn et al., *Photuris: Session-Key Management Protocol*, IETF Network Working Group, RFC 2522 (Mar. 1999) pp. 1-75.
Montenegro et al., *Statistically Unique and Cryptographically Verifiable (SUCV) Identifiers and Addresse*, Proc. ISOC Symposium on Network and Distributed System Security (NDSS 2002), San Diego (Feb. 2002) pp. 1-13.
Moskowitz, *Host Identity Payload and Protocol*, Internet Draft <draft-ietf-moskowitz-hip-05.txt> (Oct. 2001) (work in progress) pp. 1-28.
Narten et al., *Privacy Extensions for Stateless Address Autoconfiguration in IPv6*, IETF Network Working Group, RFC 3041 (Jan. 2001) pp. 1-16.

Narten et al., *Neighbor Discovery for IP Version 6 (IPv6)*, IETF Network Working Group, RFC 2461 (Dec. 1998) pp. 1-87.

Nikander, *A Scaleable Architecture for IPv6 Address Ownership*, Internet Draft <draft-nikander-ipng-pbk-addresses-00.tex> (work in progress) (Mar. 2001) pp. 1-27.

Okazaki et al., *Securing MIPv6 Binding Updates Using Address Based Keys (ABKs)*, Internet Draft <draft-okazaki-mobileip-abk-01.txt> (work in progress) (Oct. 2002) pp. 1-26.

Roe et al., *Authentication of Mobile IPv6 Binding Updates and Acknowledgment*, in Internet-Draft <draft-roe-mobileip-updateauth-02.txt> (work in progress) (Feb. 2002) pp. 1-22.

Savola, *Security of IPv6 Routing Header and Home Address Option* Internet Draft, <draft-savola-ipv6-rh-ha-security-03.txt> (work in progress) (Dec. 2002) pp. 1-17.

Shamir, *Identity-Based Cryptosystems and Signature Schemes*, Advances in Cryptology: Proc. CRYPTO 84, vol. 196 of LNCS (1998) pp. 47-53.

Arkko et al., *Securing IPv6 Neighbor and Router Discovery*, Proc. 2002 ACM Workshop on Wireless Security (WiSe) (Sep. 2002) (ACM Press) pp. 77-86.

Aura, *Cryptographically Generated Addresses (CGA)*, Internet Draft <draft-aura-cga-00.txt> (Feb. 2003) (work in progress) pp. 1-13.

O'Shea et. al., *Child-Proof Authentication for MIPv6 (CAM)*, ACM Computer Communications Review, 31(2) (Apr. 2001) pp. 1-15.

International Telecommunication Union. ITU-T recommendation X.690, *Information Technology—ASN.1 Encoding Rules: Specification of Basic Encoding Rules (BER), Canonical Encoding Rules (CER) and Distinguished Encoding Rules (DER)* (Jul. 2002).

Johnson, David B., "Mobility Support in IPv6," IETF Mobile IP Working Group, Internet Draft, Apr. 27, 2000, (116 pp.).

Johnson, David B., "Mobility Support in IPv6," IETF Mobile IP Working Group, Internet Draft, Nov. 17, 2000, (120 pp.).

Hinden, R., et al., "IP Version 6 Adressing Architecture," Internet Draft, Feb. 2, 2001, (25pp) http://www.draft-ietf-ipngwg-addr-arch-v3-04.txt.

Hinden, R., et al., "IP Version 6 Adressing Architecture," Internet Draft, Mar. 10, 2000, (25pp) http://www.draft-ietf-ipngwg-addr-arch-v3-00.txt.

Aura, Tuomas, Cryptographically Generated addresses (CGA), Microsoft Research, Roger Needham Bldg, Cambridge CB3 OFB, UK.

Gehrmann, Christian, Mitchell, Chris J., Nyberg, Kaisa, "Manual Authentication for Wireless Devices", Jan. 23, 2004, pp. 1-9.

McDune, Jonathan M., Perrig, Adrian, Reiter, Michael K., "Seeing-Is-Believing: Using Camera Phones for Human-Verifiable Authentication", School of Computer Science, Carnegie Mellon University, Nov. 2004, CMU-CS-174, pp. 1-20.

Balfanz, Dirk, Smetters, Paul Stewart, Wong, Chi H., "Talking to Strangers: Authentication in Ad-Hoc Wireless Networks", Xerox Palo Alto Research Center. 13 pgs.

Anderson, Ross, Stajano, Frank, Lee, Jong-Hyeon, "Security Policies", 43 pgs.

Intel Technology Journal, "Interoperable Home Infrastructure", vol. 6, Issue 4, Published Nov. 15, 2002, ISSN 1535-766X, 78 pgs.

Laganier, J. "Using IKE with IPv6 Cryptographically Generated Address," Network Working Group, Internet-Draft. Jul. 8, 2007, 22 pgs.

IPSEC, "Minutes of IPSEC Working Group Meeting", "2.5.2 IP Security Protocol (ipsec)". Proceedings of the 52nd Internet Engineering Task Force, Dec. 9-14, 2001, Salt Lake City, USA, Last Modified: Nov. 02, 2001. http://www3.ietf.org/proceedings/01dec/195.htm.

Kent, Christopher A., Mogul, Jeffrey C., "Fragmentation Considered Harmful", Digital Equipment Corporation, Western Research Lab (originally pub. In Proc. SIGCOMM '87, vol. 17, No. 5, Oct. 1987, 13 pgs.

Kent, S. "Security Architecture for the Internet Protocol", Netwrok Working Group, Comments: 4301, Dec. 2005, 95 pgs., http://www.rfc-editor.org/rfc/rfc4301.txt.

Kent, S., "IP Authentication Header", Network Working Group, Commetns: 4302, Dec. 2005, 35 pgs., http://rfc.net/rfc4302.html.

Kent et al. "IP Encasulating Security Payload (ESP)," Network Working Group, Comments 4303, Dec. 2005, 42 pgs.

Housley, R., Using Advanced Encryption Standard (AES) CCM Mode with Ipsec Encapsulating Security Payload (ESP), Comments: 4309, Dec. 2005, 13pgs.

OA issued in U.S. Appl. No. 10/401,241, Mail Date: Oct. 19, 2007 (14917.0549US01).

* cited by examiner

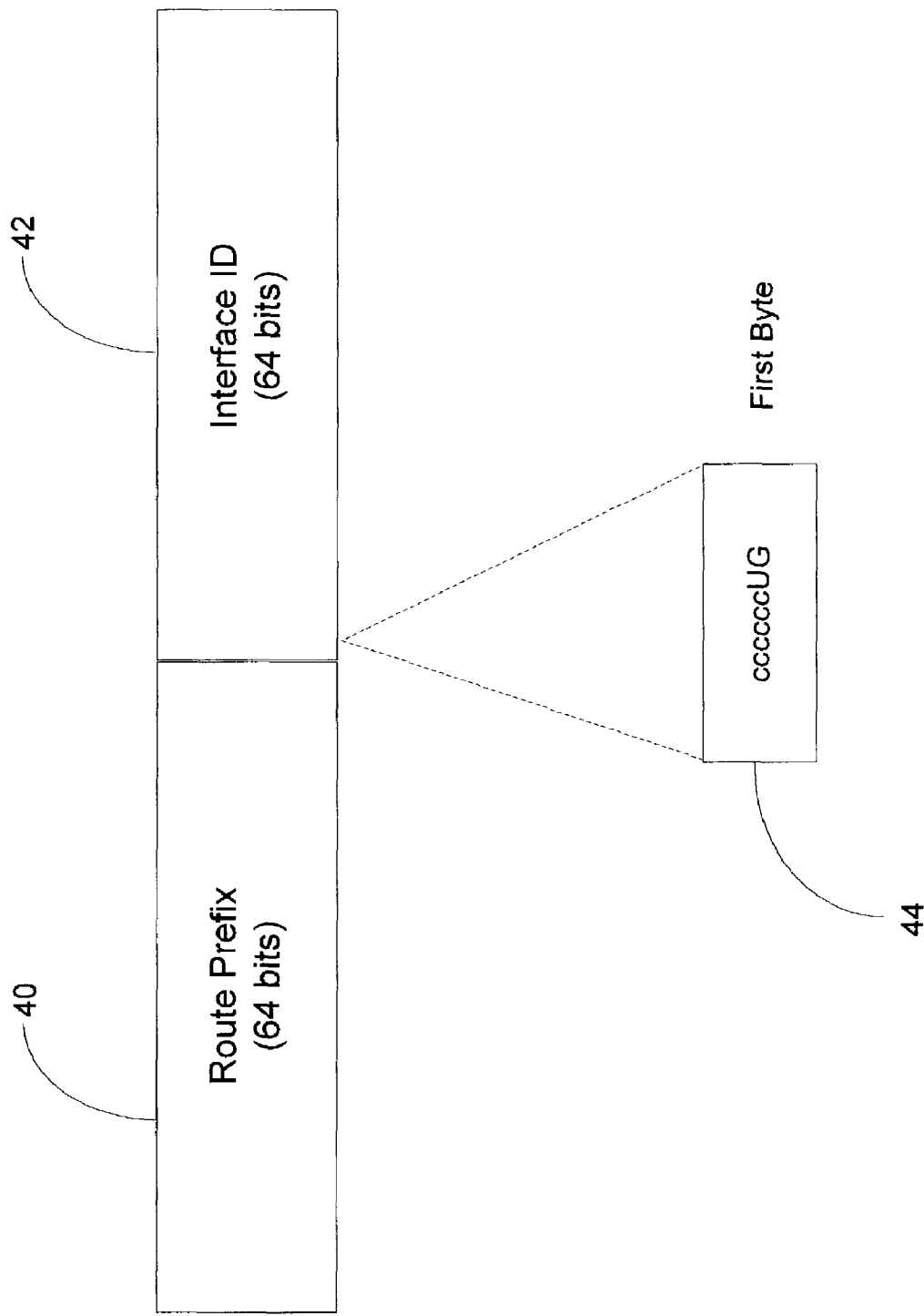

METHOD AND SYSTEM FOR AUTHENTICATING MESSAGES

CROSS REFERENCE TO RELATED APPLICATIONS

This application claims priority to U.S. Provisional Application No. 60/395,680, filed on Jul. 12, 2002.

TECHNICAL FIELD OF THE INVENTION

The invention relates generally to message authentication and, more particularly, to techniques that involve creating all or part of a network address in such a way that a device sending the network address can be authenticated.

BACKGROUND

Security is an important part of many computer networks. One aspect of network security is the ability to verify the identity of computers and/or their users. For example, in wireless networking, it is common for a client computer to be moved out of the operating range of one wireless base station and into the range of another wireless base station. When this occurs, it is often the case that the client computer receives a new network address from the new base station. To ensure that the client computer is still able to receive messages from other computers, the client computer informs a so-called "home agent" of its new address. A home agent is a computer (such as a server) that maintains a publicly known "home address" for the client computer and keeps track of the actual or "care-of" address of the client computer. When other computers wish to send messages to the client computer, they use the client computer's home address. The home agent then forwards the message to the client's "care-of" address. If a malicious entity such as a hacker wishes to intercept messages intended for the client computer, the malicious entity could simply pretend that it is the client computer and "inform" the home agent of its new care-of address. The home agent, if it was successfully tricked, would then forward the client computer's message to the malicious entity.

The above example illustrates the importance of being able to verify the identity of a computer in a wireless context. However, it is also important to be able to verify the identity of users and/or computers in wired scenarios as well.

SUMMARY

In accordance with the foregoing, a method and system for authenticating a message is provided. According to the invention, a sending device uses a network address that has a digital fingerprint. The sending device creates a message containing both the network address and data representing the size of the digital fingerprint. A receiving device using the size data and, for example, the public key of the sending device, verifies the identity of the sending device. According to various embodiments of the invention, the size data is embedded in the network address itself.

The network address may be created in a variety of ways. According to one embodiment, a first portion of the network address is made up of a cryptographic hash of the public key and the private key of the sending device or its user. The network address also includes a code that indicates how many bits of the network address constitute the first portion.

Additional aspects of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention may be best understood from the following detailed description taken in conjunction with the accompanying drawings of which:

FIG. 4 illustrates the format of an IPv6 packet;

DETAILED DESCRIPTION

The invention is generally directed to a method and system for authenticating a message, in which the message contains a network address, at least a portion of which is a digital fingerprint of the device sending the message. Embedded in the message is data, such as a code, that indicates the size of the digital fingerprint. A device receiving the message uses the size data and, for example, the public key of the sending device to attempt to reproduce the digital fingerprint. If successful, the receiving device verifies the identity of the sender.

Prior to proceeding with a description of the various embodiments of the invention, a description of the computer and networking environment in which the various embodiments of the invention may be practiced will now be provided. Although it is not required, the present invention may be implemented by program modules that are executed by a computer. Generally, program modules include routines, objects, components, data structures and the like that perform particular tasks or implement particular abstract data types. The term "program" as used herein may connote a single program module or multiple program modules acting in concert. The invention may be implemented on a variety of types of computers. Accordingly, the terms "device," "computing device" and "computer" as used herein include personal computers (PCs), hand-held devices, multi-processor systems, microprocessor-based programmable consumer electronics, network PCs, minicomputers, mainframe computers and the like. The invention may also be employed in distributed computing environments, where tasks are performed by remote processing devices that are linked through a communications network. In a distributed computing environment, modules may be located in both local and remote memory storage devices.

Figure 1:
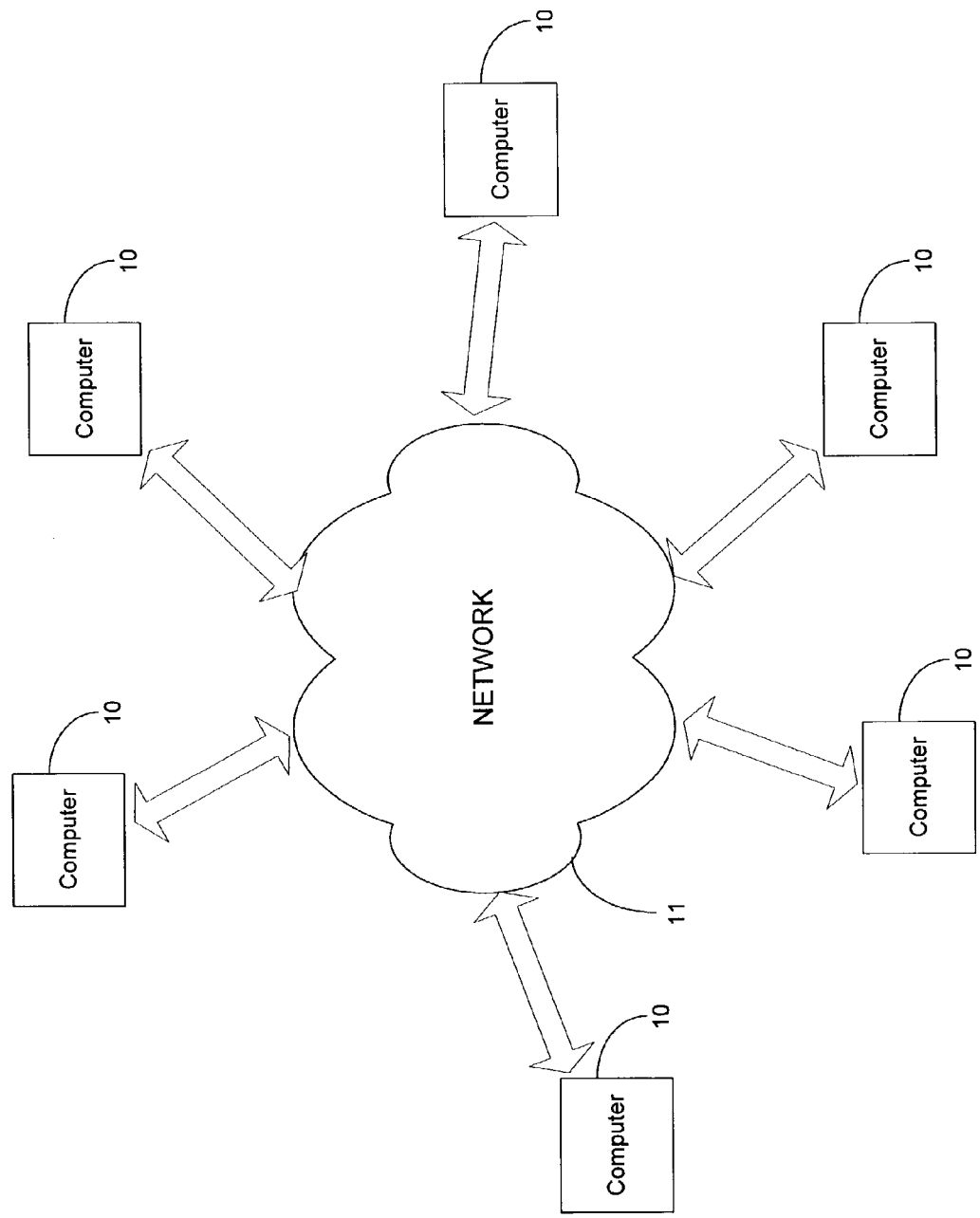
FIG. 1 illustrates an example of a computer network in which the invention may be practiced.

An example of a networked environment in which the invention may be used will now be described with reference to FIG. 1. The example network includes several computers 10 communicating with one another over a network 11, represented by a cloud. Network 11 may include many well-known components, such as routers, gateways, hubs, etc. and may allow the computers 10 to communicate via wired and/or wireless media. When interacting with one another of the network 11, one or more of the computers may act as clients, servers or peers with respect to other computers. Accordingly, the various embodiments of the invention may be practiced on clients, servers, peers or combinations thereof, even though specific examples contained herein don't refer to all of these types of computers.

Figure 2:
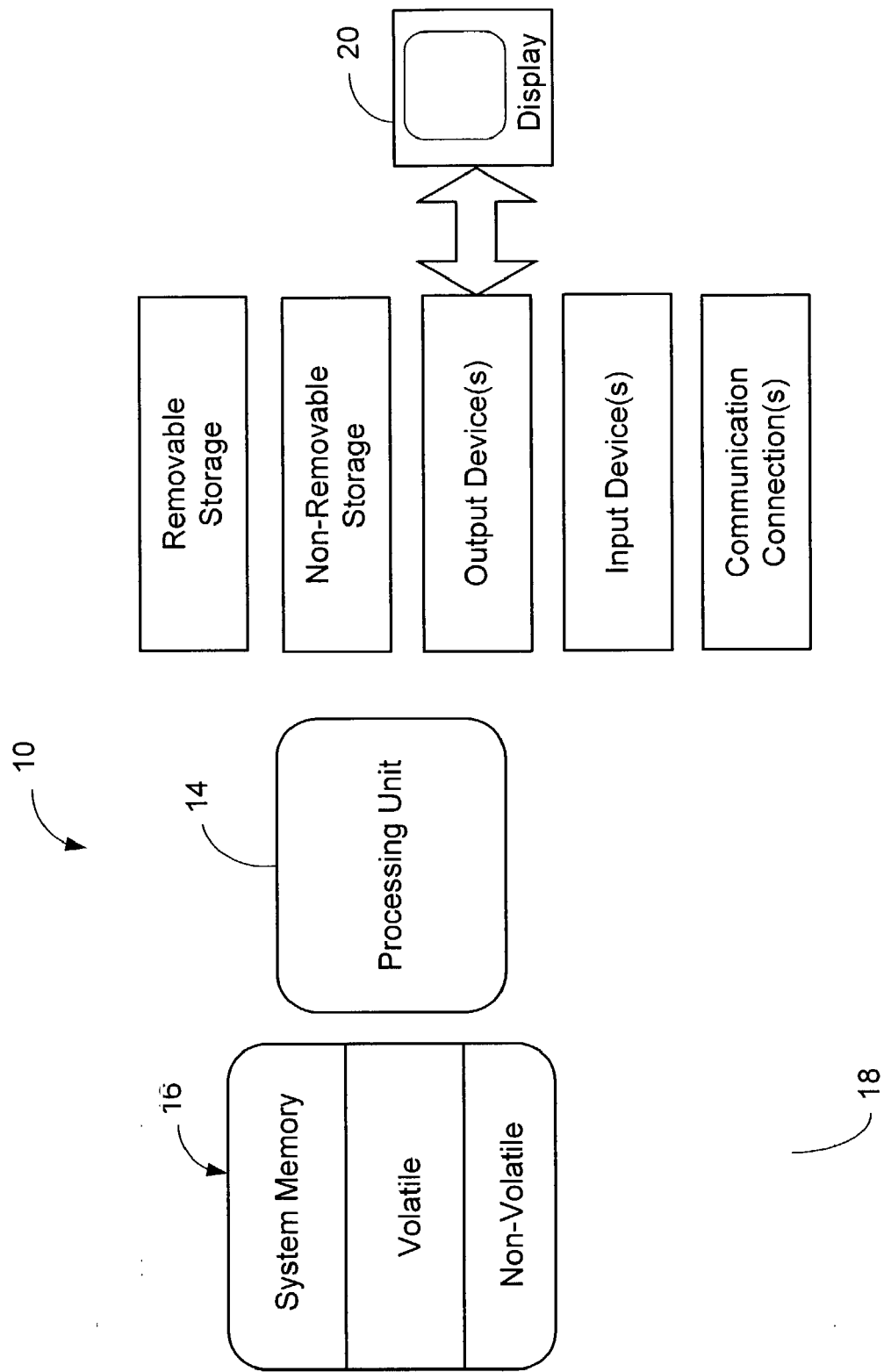
FIG. 2 illustrates an example of a computer on which at least some parts of the invention may be implemented.

Referring to FIG. 2, an example of a basic configuration for a computer on which all or parts of the invention described herein may be implemented is shown. In its most basic configuration, the computer 10 typically includes at least one processing unit 14 and memory 16. Depending on the exact configuration and type of the computer 10, the memory 16 may be volatile (such as RAM), non-volatile (such as ROM or flash memory) or some combination of the two. This most basic configuration is illustrated in FIG. 2 by dashed line 18. Additionally, the computer may also have additional features/functionality. For example, computer 10 may also include additional storage (removable and/or non-removable) including, but not limited to, magnetic or optical disks or tape. Computer storage media includes volatile and non-volatile, removable and non-removable media implemented in any method or technology for storage of information, including computer readable instructions, data structures, program modules, or other data. Computer storage media includes, but is not limited to, RAM, ROM, EEPROM, flash memory, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 10. Any such computer storage media may be part of computer 10.

Computer 10 may also contain communications connections that allow the device to communicate with other devices. A communication connection is an example of a communication medium. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. The term computer readable media as used herein includes both storage media and communication media.

Computer 10 may also have input devices such as a keyboard, mouse, pen, voice input device, touch input device, etc. Output devices such as a display 20, speakers, a printer, etc. may also be included. All these devices are well known in the art and need not be discussed at length here.

Figure 3:
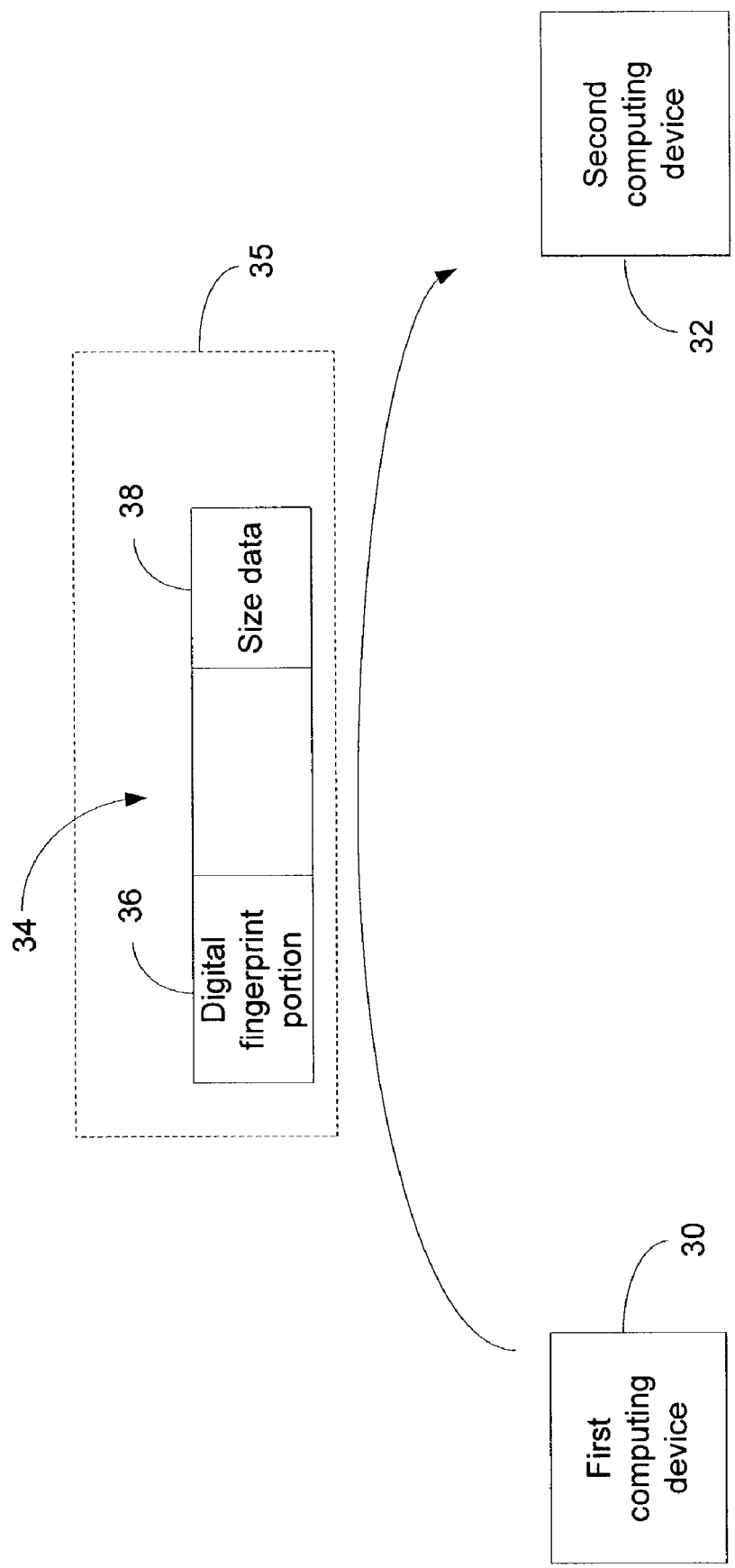
FIG. 3 illustrates an example of how messages are sent from one computing device to another computing device in an embodiment of the invention.

Referring to FIG. 3, an example of how data flows from a first computing device 30 to a second computing device 32 according to an embodiment of the invention will now be described. The first computing device 30, has a network address 34. A portion 36 of the network address 34 acts as a digital fingerprint that identifies the first computing device 30. That portion 36 of the network address 34 is created based on a private key of the first computing device 30 or the private key of a user of the first device 30. The first computing device 30 transmits the network address 34, including the digital fingerprint portion 36, as part of a message 35 to the second computing device 32. The type of network address used by the first computing device may be any of a variety of types, including an IP address, a URL or a MAC address. The network address 34 of the first computing device 30 may be completely or partially generated by the first computing device 30 itself, or by another computer such as a router or gateway that serves the first computing device 30. The first computing device 30 also transmits data representing the size of the digital fingerprint portion 36 of the network address 34 to the second computing device 32. This size data is generally labeled 38, and can be expressed in a variety of ways. According to one implementation, the size data 38 is expressed in terms of the number of bits in the digital fingerprint portion 36 of the network address 34. The public key of the first computing device 30 may be sent to the second computing device 32 prior to, or during the transmissions depicted in FIG. 3. In some implementations, the second computing device 32 obtains the public key of the first computing device 30 from a third party source, such as a public key registry.

When the second computing device 32 receives the message 35, it uses the size data 38 to determine what portion of the network address 34 is represents the digital fingerprint. It also executes an algorithm using the public key of the first computing device 30. If the result of the algorithm is equal to the digital fingerprint portion 36 of the network address 34, then the second computing device 32 deems the first computing device 30 to be successfully authenticated. If the result of the algorithm is not equal to the digital fingerprint portion 36 of the network address 34, then the second computing device 32 deems the first computing device 30 to be unauthenticated.

According to an embodiment of the invention, the network address that the first computing device 30 (FIG. 3) uses is an Internet Protocol Version 6 (IPv6) address. IPv6 addresses are 128 bits long. An example of an IPv6 address is shown in FIG. 4. It includes a 64-bit route prefix, labeled 40, and a 64-bit interface ID, labeled 42. The interface ID is also referred to herein as the "node selectable portion." When an IPv6 address is used in the header of an IPv6 packet that is sent through a network, routers generally use the route prefix 40 to get the packet to the proper destination subnet, while the subnet uses the interface ID 42 to get the packet to the appropriate computer on the subnet. The interface ID 42 is, by convention, formatted as an IEEE EUI-64 identifier. The two least significant bits of the first byte (labeled 44 in FIG. 4) of the interface ID 44 are the "U" bit and the "G" bit. The "U" bit indicates whether or not the interface ID 44 is universal or local, and the "G" bit indicates whether the interface ID represents a group or an individual entity.

In an embodiment of the invention, the first computing device 30 (FIG. 3) creates an IPv6 address, such as that shown in FIG. 4, chooses a certain number of bits of the IPv6 address such that they represent a digital fingerprint, and indicates in the first byte 44 (FIG. 4) how many bits of the IPv6 address represent the digital fingerprint. It is to be understood that, in other embodiments, other portions of the network address besides the first byte may be used to convey this information. For example, the last byte of the interface ID may be used. This specially-formatted address becomes the network address 34 (FIG. 3) that the first computing device 30 transmits to the second computing device 32. This network address is valid and routable in the network of which the first computing device 30 is a part, and is otherwise usable by the first computing device 30 in the same manner as any other IPv6 address. When the second computing device 32 receives the network address 34, it examines the first byte 44 to determine how many bits of it needs to match in the network address 34, and executes an algorithm on the first computing device's public key. The second computing device 32 extracts, from the result of the algorithm, the number of bits indicated by the first byte 44, and compares those bits with the bits of digital fingerprint contained in the network address 34. For example, if the first byte 44 indicates that 62 bits of the network address 34 represent the digital fingerprint, the second computing device 32 extracts 62 bits from the result of the algorithm performed on the first computing device's public key and compares those 62 bits with the appropriate 62 bits of the network address 34. If the two 62-bit sets match, then the second computing device 32 recognizes the first computing device 30 as the proper sender.

There are many ways in which the first computing device 30 (FIG. 3) can use the IPv6 interface ID 42 (FIG. 4) to express how many bits of the IPv6 address constitute the digital fingerprint. In one embodiment, the first computing device 30 and the second computing device 32 each have a look-up table that maps the value of the first byte 44 to the number of encrypted bits. An example of such a table is shown below as Table 1, in which "c" represents "don't care" digits. It is to be understood that the scheme represented by Table 1 is usable regardless of which byte of the network address is used to express many bits are in the digital fingerprint.

TABLE 1

| First Byte of Interface ID | Meaning | Where An Example Is Shown |
|---|---|---|
| ccccccc00 | No digital fingerprint is used | |
| ccccccc01 | No digital fingerprint is used | |
| ccccccc10 | 62 bits represent a digital fingerprint | |
| cccccc011 | 67 bits represent a digital fingerprint | |
| ccccc0111 | 75 bits represent a digital fingerprint | |
| cccc01111 | 83 bits represent a digital fingerprint | |
| cc011111 | 91 bits represent a digital fingerprint | |
| c0111111 | 98 bits represent a digital fingerprint | |
| 01111111 | 104 bits represent a digital fingerprint | |
| 11111111 | 120 bits represent a digital fingerprint | |

Figure 5A:
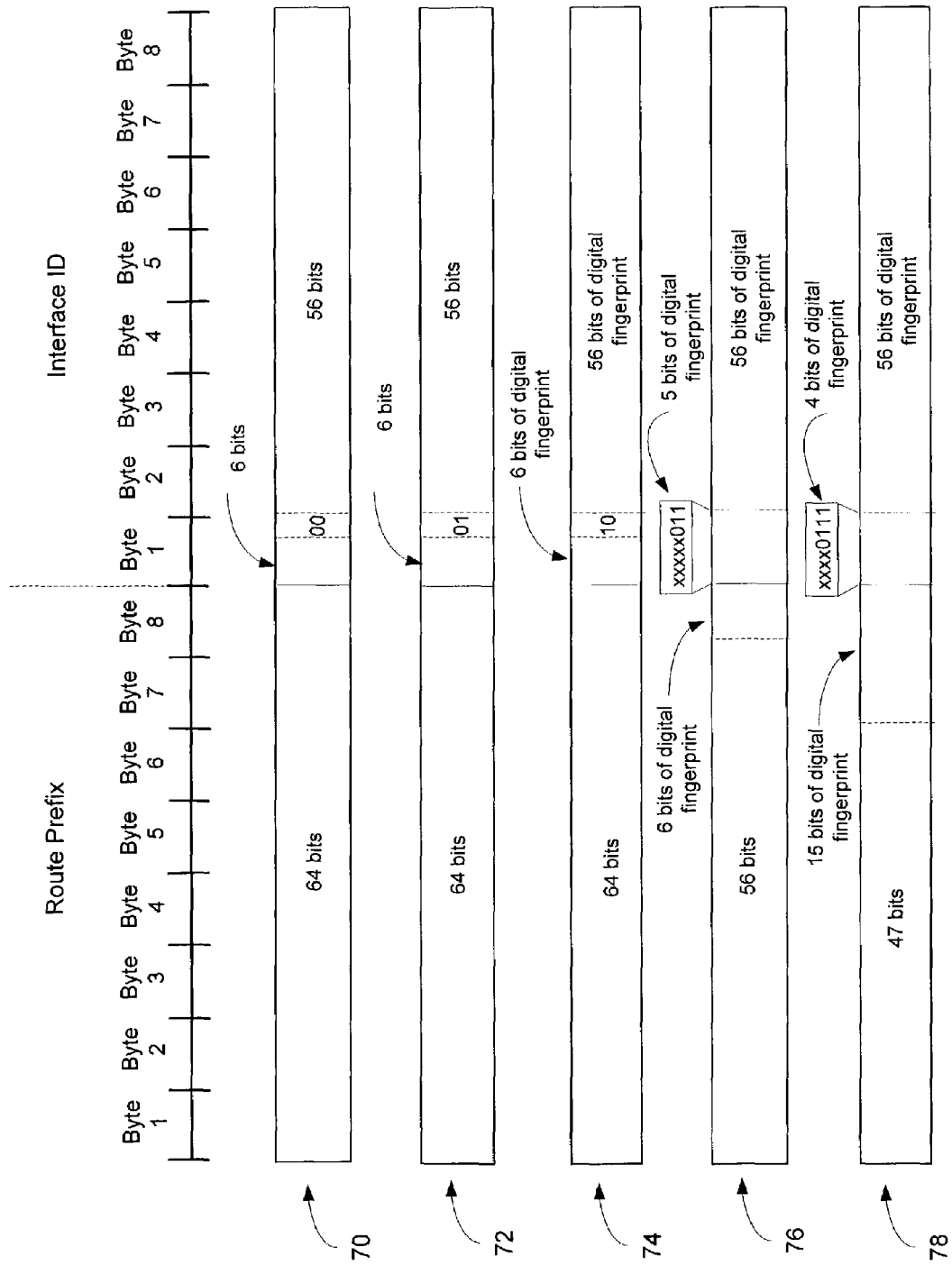
FIGS. 5a and 5b illustrate how packets are formatted in an embodiment of the invention.
Figure 5B:
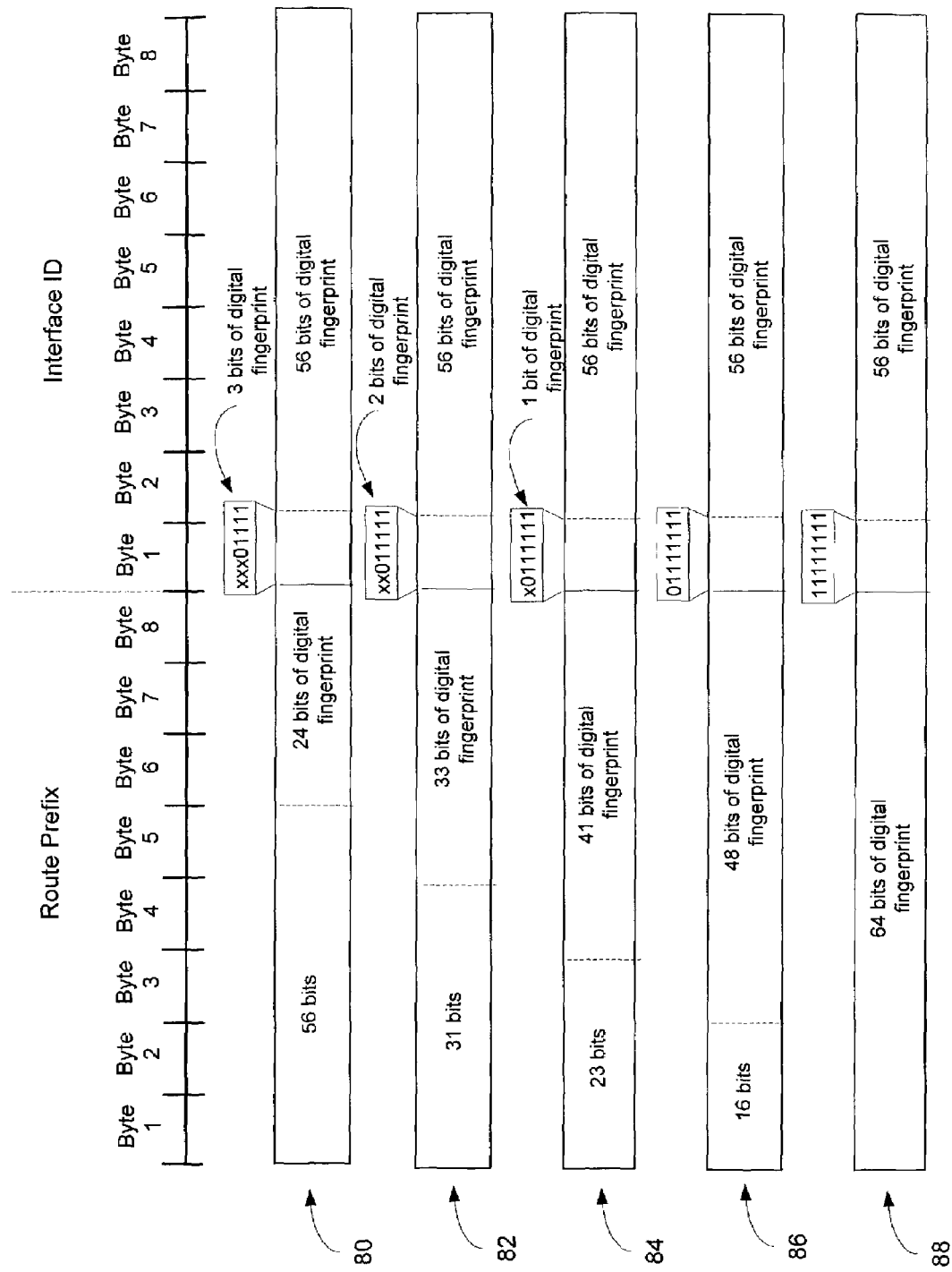

Exactly which bits in the IPv6 address represent the digital fingerprint can be established before the communication between the first computing device 30 and the second computing device 32 occurs. An example of one way in which the bits that represent the digital fingerprint are selected is shown in FIGS. 5*a* and 5*b*, in which ten different 128-bit IPv6 addresses are shown and labeled 70-88. In the addresses 70 and 72, there is no digital fingerprint. The U and G bits of the address 70 are set to 0, while in the address 72, that U and G bits are set to 0 and 1 respectively. In the address 74, the digital fingerprint is represented by 62 bits of the Interface ID, including 6 bits of the first byte.

In the addresses 78 through 88, portions of the route prefix represent the digital fingerprint. The portion of the route prefix that represents the digital fingerprint is the smallest in the address 78 and the largest in the address 88. In the address 88, all of the route prefix is part of the digital fingerprint. Referring back to FIG. 3, when the first computing device 30 sends its address to the second computing device 32 using one of the schemes of Table 1 and FIGS. 5*a*-5*b*, the second computing device 32 determines how many bits of the address constitute the digital fingerprint (and, consequently how many bits need to be matched) based on the contents of the first byte of Interface ID. Additionally, the second computing device 32 knows which bits represent the digital fingerprint based on a common understanding with the first computing device 30. For example, if the first computing device 30 sends its address to the second computing device 32 in the form of the address 84 shown in FIG. 5*b*, then the second computing device would see the pattern 0111111 in the first byte of the Interface ID and would realize that the digital fingerprint is 98 bits long. Based on its common understanding with the first computing device 30, the second computing device 32 would know that the 98 bits of the digital fingerprint (the 98 bits that the second computing device needs to match) includes the 56 bits of bytes 2-8 of the Interface ID, the most significant bit of byte 1 of the Interface ID, and the 41 least significant bits of the route prefix.

Figure 6A:
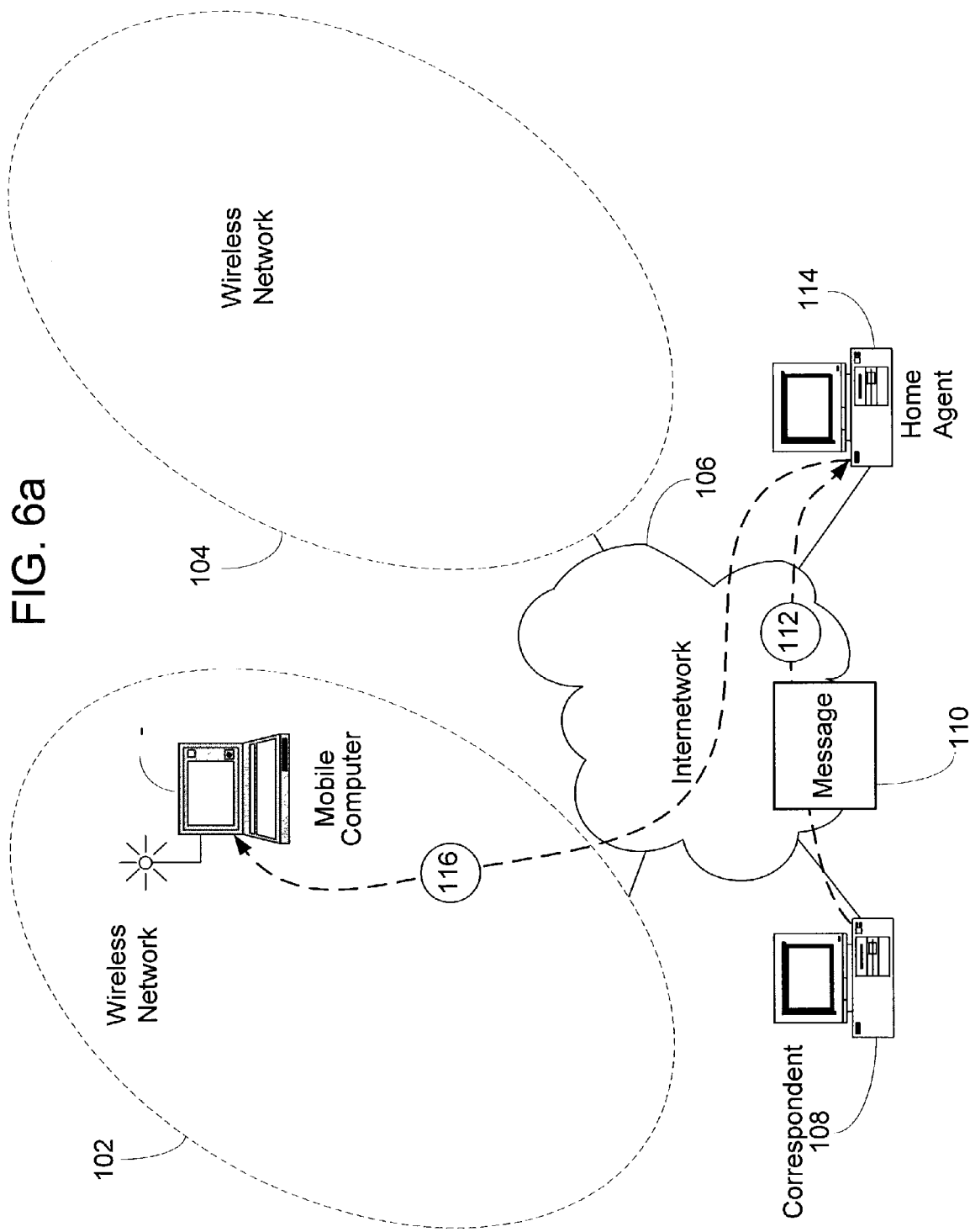
FIGS. 6a and 6b illustrate wireless networks configured according to an embodiment of the invention

Referring to FIG. 6*a* an example of a scenario in which the invention may be used will now be provided. In this example, there is a first wireless network 102 and a second wireless network 104. The first and second wireless networks each have access to an internetwork 106. The internetwork 106 may comprise one or more land networks, including the Internet. When a mobile computer 100 moves to the second wireless network 104, the address of the mobile computer 100 changes. A home agent 114 keeps track of the current address of the mobile computer 100 and acts as base station for the mobile computer 100. Third parties can send messages to the home agent 114 that the home agent 114 then forwards to the mobile computer 100.

In this example, another computer, which will be referred to as a correspondent 108, wishes to send messages to the mobile computer 100. To get a message to the mobile computer 100, the correspondent 108 sends the message, labeled 110, to the mobile computer's "home address." Following a first message path 112, the message is received by the home agent 114. By reading the home address in the message 110, the home agent 114 determines that the message 110 is intended for the mobile computer 100. The home agent 214 translates the mobile computer's home address into the mobile computer's current or care-of address and forwards the message along a second message path 116 to the mobile computer 100.

Figure 6B:
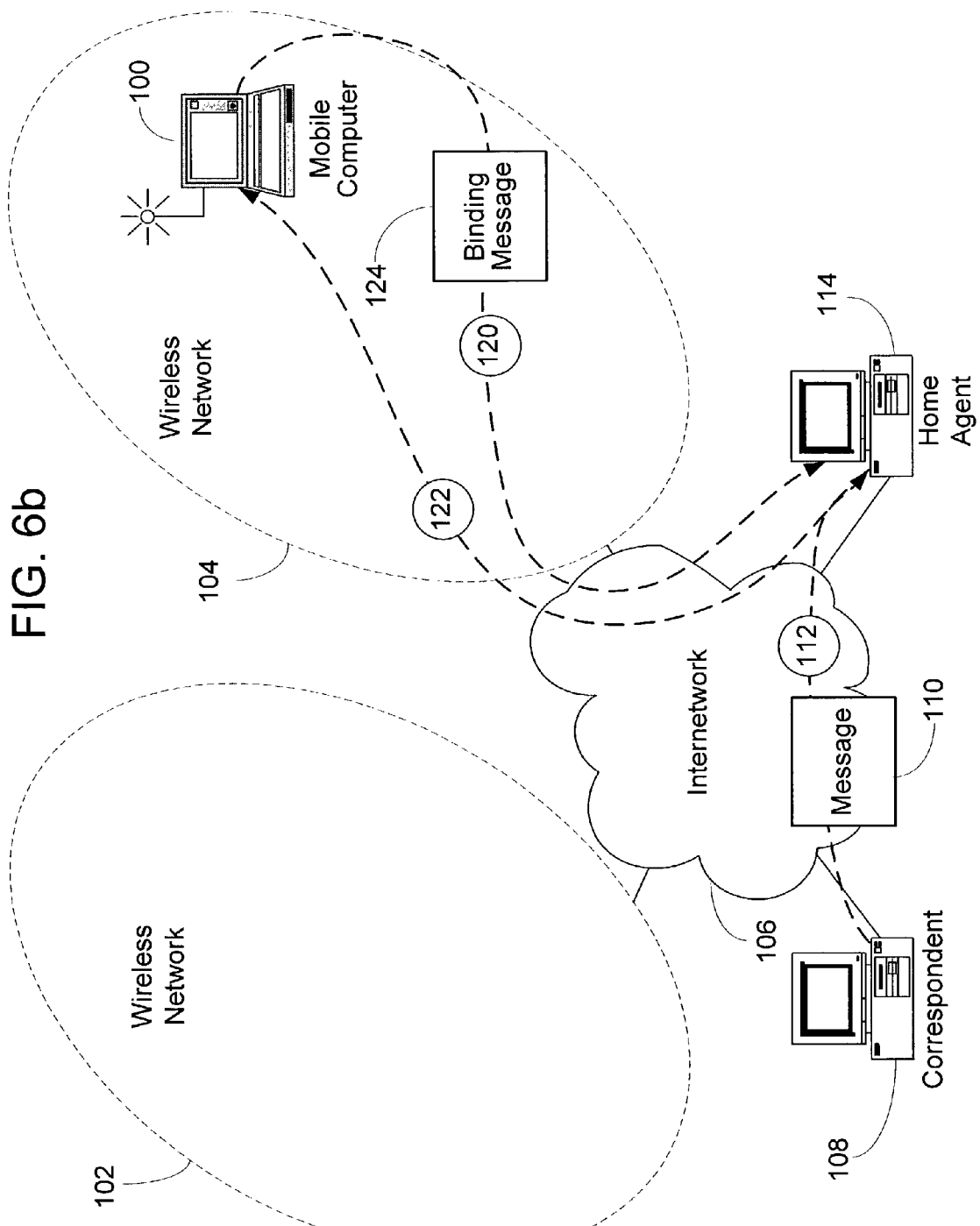
Figure 7:
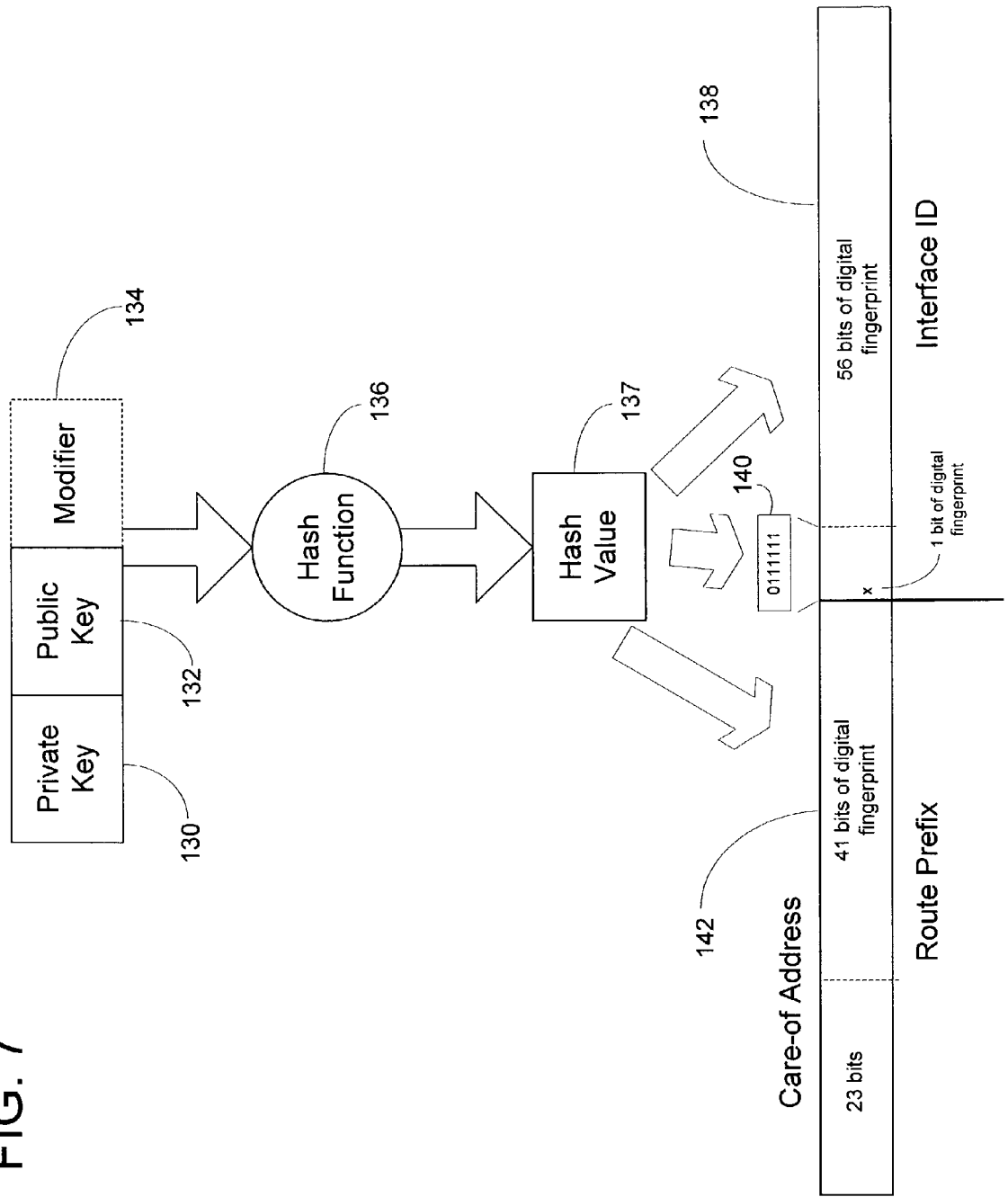
FIG. 7 illustrates how a network address is created in an embodiment of the invention.

As shown in FIG. 6*b*, the mobile computer 100 moves to the second wireless network 104. It then obtains a new "care-of" network address. To update the home agent 114 regarding its new care-of address, the mobile computer 100 prepares a binding message 124, which if formatted as shown in FIG. 7. The binding message 124 travels along a message path 120 to the home agent 114. Upon receipt of the binding message 124, the home agent 114 changes an entry in a message forwarding translation table that it maintains. Future messages addressed to the mobile computer's home address are now forwarded to the new address contained in the binding message. For example, the correspondent 108, oblivious to the change in the mobile computer's care-of address, sends another message 110 via a first message path 112 to the mobile computer's home address. The home agent 114 translates the home address into the new address and forwards the message 110 over a second message path 122 to the mobile computer 100. Thus, the correspondent 108 is able to stay in communication with the mobile computer 100 even though the correspondent is unaware of the change in the mobile computer's care-of address.

To ensure that an attacker does not trick the home agent 114 by generating a fraudulent binding message, the mobile computer 100 uses its public key and its private key to create a hash value, uses at least some of the bits of the hash value as a digital fingerprint, populates its "care-of" address with the digital fingerprint and populates another portion of the care-of address with a code indicating how many bits of the care-of address constitute the digital fingerprint. The home agent 114, upon receiving the binding message, calculates a hash of the mobile computer's public key, and compares at least part of the results of the hash with the digital fingerprint contained in the care-of address. If the two values match, then the home agent 114 updates its binding table to reflect the new care-of address. If the two values do not match, then the home agent 114 ignores the binding message.

An example of how the binding message is created will now be described in conjunction with FIGS. 7 and 8. In this example, it is assumed that the mobile computer 100 is using the 98-bit matching scheme shown in FIG. 5*b*, so that it will try to format its care-of address like the address 84. The mobile computer 100 first obtains a 64-bit node prefix from the second wireless network 104. The mobile computer 100 then creates a digital fingerprint such that at least 41 bits of the digital fingerprint match the least significant 41 bits (reference numeral 142) of the route prefix received from the second wireless network 104 (FIG. 6*b*). To generate the digital fingerprint, the mobile computer 100 takes its private key, labeled 130 (FIG. 7), its public key, labeled 132, and, optionally, a modifier 134, and performs a mathematical operation on these values using a hash function 136. The modifier 134 may be a value derived from a variety of sources. It may, for example, be a randomly-generated two bit number. The result of the operation is a hash value, labeled 137.

There are many ways in which the mobile computer 100 can ensure that the care-of address ends up containing the digital fingerprint and the code that indicates the size of the digital fingerprint. In an embodiment of the invention, the mobile computer 100 chooses the private key 130 and/or the public key 132 in such a way as to ensure that 41 bits of the resulting hash value 137 equal the least significant 41 bits of the router prefix (reference numeral 142). The mobile computer 100 then populates the least significant 56 bits of its care-of address, labeled 138, with the corresponding bits of the hash value 137. The mobile computer 100 also substitutes the most significant bit of the Interface ID with the corresponding bit of the hash value 137. The mobile computer 100 then substitutes the least significant seven bits of the first byte of the Interface ID (labeled 140) with the code 0111111 to indicate that 98 bits of the care-of address are encrypted. Finally, the mobile computer 100 substitutes the least significant 41 bits of the route prefix with the corresponding 41 bits of the hash value 137.

There are many alternative ways in which the mobile computer 100 may generate the network address. For example, the mobile computer 100 may generate the entire care-of address using a hash function. In such a case, the mobile computer may chose the private key and/or the public key so that the resulting hash value includes the route prefix obtained from the second wireless network 104 (FIG. 6*b*), the interface ID (including those portions that are a part of the digital fingerprint) and the code indicating the size of the digital fingerprint.

There are a variety of ways in which the hash function 136 may be implemented. For example, when the public key is based on the well-known RSA algorithm, one of the following two functions may be used:

```
Create a prime number P[0];
Set I = 1;
Repeat
    Begin
        Create a new prime number P[I];
        For (J=0 to I-1) do
            begin
                Compute K=P[I]*P[J];
                If (fingerprint(K) = =target)
                    Return (K); // Declare success!
            End
        I = I+1;
    End
```

If the fingerprint is the hash of an RSA-based public key and another component, such as a free form name, an algorithm that simply iterates over the several versions of the free form name can be used. An example of such an algorithm is as follows:

```
Select a public key, K;
Set I = 1;
Repeat
    Begin
        Select a new free form name N[I]
        If (fingerprint(K,N[I]) = = target)
            Return (K,N[I]);//Declare success!
    I=I+1;
    End
```

Figure 8:
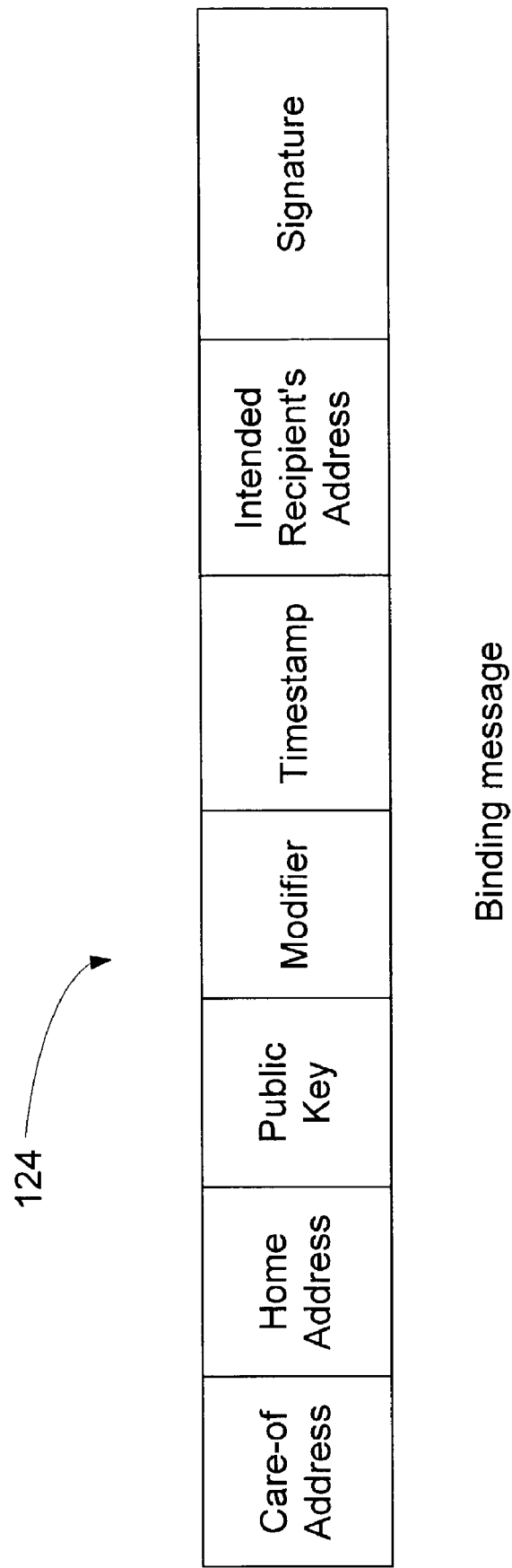
FIG. 8 illustrates a binding message formatted according to an embodiment of the invention.

The mobile computer 100 then creates a binding message, as shown in FIG. 8. The binding message includes the current care-of address for the mobile computer 100, the modified home address of the mobile computer 100, the public key of the mobile computer 100, the modifier, a timestamp, and the address of the intended recipient. The binding message also includes a signature, which, in this example, is a hash of the care-of address, the home address, the public key, the modifier, the timestamp; and the address of the intended recipient. The mobile computer 100 then transmits the binding message 144 to the home agent 114.

When the home agent 114 receives the binding message 144, it attempts to verify the identity of the sender by performing the same hashing operation that the mobile computer 100 performed (which was shown in FIG. 7). The home agent 114 extracts the care-of address from the binding message, and locates the code 140. The home agent 114 then refers to a look-up table to determine, based on the code 140, how many bits of the care-of constitute the digital fingerprint.

The home agent 114 then calculates a cryptographic hash of the private key and public key of the mobile computer and if used in the hashing operation of the mobile computer 100, the modifier. The home agent 114 then takes the number of bits specified by the code 140 from the hash results and compares them to the digital fingerprint portion of the care-of address. For example, if, as shown in FIG. 7, the code 140 is 0111111 then, using Table 1 as the look-up table, the home agent 114 will conclude that 98 bits of the care-of address are encrypted. The home agent 114 will therefore take 98 bits of the hash that it calculated and compare them to the 98 bits of the digital fingerprint. The choice of which 98 bits of the hash to compare will be made according to a common scheme shared by the mobile computer 100 and the home agent 214. In this example, the digital fingerprint portion of the care-of address is the 56 least significant bits of the Interface ID, plus the least significant 41 bits of the routing prefix, plus the most significant bit of the Interface ID. If, based on the comparison, the two sets of bits match, then the home agent 114 will process the binding message and update the forwarding translation table. If the two sets of bits do not match, then the home agent 114 disregards the binding message.

It can thus be seen that a new and useful method and system for authenticating messages has been provided. In view of the many possible embodiments to which the principles of this invention may be applied, it should be recognized that the embodiments described herein with respect to the drawing figure is meant to be illustrative only and should not be taken as limiting the scope of invention. For example, those of skill in the art will recognize that the elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

I claim:

1. A method of operating a computer, the method being for authenticating messages, the method comprising:
   creating a network address, at least a portion of which matches a result of a cryptographic function, the step of creating the network address comprising calculating a hash of a public key according to the cryptographic function to obtain the result, and using at least a portion of the result as at least a portion of the network address; and
   indicating, within the address, how much of the created network address matches the result of the cryptographic function, the indicating step comprising populating at least a portion of the network address with a code representing the number of bits in length of the portion of the network address that is represented by the result.

2. The method of claim 1, further comprising creating a message, wherein the network address and the public key are included in the message.

3. The method of claim 1, wherein the portion of the result is used as at least a portion of a route prefix of the network address.

4. The method of claim 1, wherein the portion of the result is used as at least a portion of a node selectable portion of the network address.

5. A method of operating a computer, the method being for authenticating messages, the method comprising:
   creating a network address, at least a portion of which matches a result of a cryptographic function;
   indicating, within the address, how much of the created network address matches a result of the cryptographic function;
   creating a message;
   including a public key in the message;
   calculating a hash of the public key according to the cryptographic function to obtain the result; and
   including the network address in the message.

6. The method of claim 5, wherein the indicating step comprises setting one or more bits in the network address, wherein the number of bits set is proportional to the size of the portion of the network address that matches the result of the cryptographic function.

7. The method of claim 5, wherein at least a portion of the result is used as at least a portion of a route prefix of the network address.

8. The method of claim 5, wherein at least a portion of the result is used as at least a portion of a node selectable portion of the network address.

9. A method of operating a computer, the method being for authenticating messages, the method comprising:
   creating a network address, at least a portion of which matches a result of a cryptographic function;
   indicating, within the address, how much of the created network address matches the result of the cryptographic function;
   creating a message;
   including a public key in the message;
   calculating a hash of the public key according to the cryptographic function to obtain the result;
   using at least a portion of the result as a node selectable portion of the network address; and
   inserting a code in the message, the code representing the number of bits of the address that matches the result.

10. The method of claim 9, wherein at least another portion of the result is used as at least a portion of a route prefix of the network address.

11. A method of operating a computer, the method being for authenticating messages, the method comprising:
    creating a first portion of a network address according to a cryptographic function;
    creating a second portion of the network address without using the cryptographic function;
    creating a message comprising the first portion of the network address and the second portion of the network address;
    indicating, within the message, the size of the first portion of the network address;
    including a public key in the message;
    calculating a hash of the public key according to the cryptographic function to obtain a result; and
    using at least a portion of the result as the first portion of the network address; and
    inserting a code within the message, the code representing the number of bits in length of the first portion.

12. A method of operating a computer, the method being for authenticating messages, the method comprising:
    creating a first portion of a network address according to a cryptographic function, wherein the step of creating the first portion comprises calculating a hash of a public key according to the cryptographic function to obtain a result, and using at least a portion of the result as the first portion of the network address;
    creating a second portion of the network address without using the cryptographic function;
    creating a message comprising the first portion of the network address and the second portion of the network address;
    indicating, within the message, the size of the first portion of the network address, wherein the indicating step comprises creating a third portion of the network address using a code representing the number of bits in length of the first portion, thereby indicating how many bits are to be used by a device to verify the sender of the message.

13. The method of claim 12, wherein the public key is included in the message.

14. A method for authenticating messages, the method comprising:
    a sending device calculating a cryptographic hash of a public key;
    the sending device creating a network address comprising a digital fingerprint made up of at least some portion of the cryptographic hash and a code indicating the number of bits that are in the digital signature;

a receiving device receiving a message from the sending device, the message comprising the digital fingerprint and the code indicating the size of the digital fingerprint;

the receiving device calculating a second cryptographic hash using the public key of the sending device and the code;

the receiving device comparing at least part of the second cryptographic hash with the digital fingerprint;

based on the comparing step, the receiving device complying with or ignoring the message.

\* \* \* \* \*